United States Patent [19]
Kitamura et al.

[11] Patent Number: 5,923,316
[45] Date of Patent: Jul. 13, 1999

[54] OPTIMIZED COLOR SPACE CONVERSION

[75] Inventors: John Kitamura; Andreas Thut, both of Toronto; Indra Laksono, Richmond Hill, all of Canada

[73] Assignee: ATI Technologies Incorporated, Unionville, Canada

[21] Appl. No.: 08/732,811

[22] Filed: Oct. 15, 1996

[51] Int. Cl.$^6$ .................................................. G09G 5/04
[52] U.S. Cl. ........................................ 345/154; 345/199
[58] Field of Search .................................... 345/154, 153, 345/155, 150, 199; 358/518, 519; 348/660, 675

[56] References Cited

U.S. PATENT DOCUMENTS 5,506,604  4/1996  Nally et al. ............................. 345/154
5,760,762  6/1998  Yamamoto ............................. 345/154
5,808,630  9/1998  Pannel .................................... 345/154

*Primary Examiner*—Regina Liang
*Attorney, Agent, or Firm*—Pascal & Associates

[57] ABSTRACT

A method of converting video data from a YUV format to an RGB format comprising (a) performing a matrix transformation of Y, U and V pixel data of a set of possible Y, U and V parameters into corresponding R, G and B parameters, (b) determining whether the set of R, G and B parameters forms a first lookup table whose size exceeds the size of a particular memory space, (c) in the event the lookup table is too large for the memory space, truncating least significant bits of at least the U and V parameters, (d) repeating steps (a), (b) and (c) until the first lookup table fits the memory space, and then storing the first lookup table in the memory space, and (e) using the first lookup table to provide RGB pixel data using the YUV data as addresses thereto.

7 Claims, 5 Drawing Sheets

FIG. 5

OPTIMIZED COLOR SPACE CONVERSION

FIELD OF THE INVENTION

This invention relates to video display processors in desktop computer systems, and in particular to a method of converting video data from a YUV format to an RGB format.

BACKGROUND TO THE INVENTION

High quality video display is an important feature in desktop computer systems. In systems based on the Pentium processor sold by Intel Corporation, and which utilize the Windows operating system, the MPEG compression standard is typically used. The compressed video is encoded in YUV space, in which, in the YUV12 format, consists of a plane of Y data, i.e. a grey scaled portion or luminance of the video image, and two planes of data respectively called U and Y data, which is the color or chrominance portion of the video image. The U and V planes are subsampled by two. Thus, for a 352×240 pixel video image, there exists a 352×240 pixel Y plane and two 176×120 pixel U and V planes.

On the other hand, the graphics display of such computers exists in RGB space, which can be considered as three overlaid planes of red, green and blue intensities In a graphics system of the desktop computer which is to display video, the video signal must be converted from YUV space to RGB space.

The planes of data and their transformation are illustrated in FIG. 1. A 352×240 pixel Y plane of data 1 and corresponding 176×120 pixel U and V planes 2 each of ¼ the size of the Y plane (having been subsampled in each direction by two), is converted to the three R, G and B planes 3 which define the RGB form of image to be displayed on the computer monitor.

Conversion is performed by a matrix multiplication $R=1.164(Y\text{-}16)+1.596(V\text{-}128)$ $G=1.164(Y\text{-}16)-0.813(V\text{-}128)-0.39(U\text{-}128)$ $B=1.164(Y\text{-}16)+2.018(U\text{-}128).$ This is computationally expensive and is often accelerated in special purpose hardware with a digital signal processor (DSP) The Intel Pentium P5 processor does not support the level of DSP functions required to be able to convert a single pixel in a single cycle.

Typically, for optimal conversion when a computationally expensive process is required, a table lookup scheme is used. All the calculations for the complete set of possible parameters are pre-computed into a table, and the parameters are used as indeces to that table. This gives the minimum computation time, but can require an enormous amount of memory for the table. In this case, the YUV data values would be accepted as an index into a table of RGB data values.

SUMMARY OF THE INVENTION

The present invention is a method of performing this YUV to RGB conversion in software at rates which make full speed playback of video, e.g. at 30 frames per second, achievable. As will be noted below, laboratory tests have shown that a 352×240 pixel video image can be processed at about 80 frames per second in a desktop computer using a 120 MHz Pentium microprocessor.

In accordance with an embodiment of the invention, a lookup table size that is scalable is used. The amount of free memory available for a lookup table will vary depending on circumstances. For example, other application programs may be running on the computer which require memory. Different graphics accelerators may have different amounts of memory available. Different Windows resolutions will require different amounts of display memory.

Reducing the size of the lookup table will increase the error component in the conversion, which reduces picture quality. However a full speed video playback as can be achieved with this invention will appear to increase the decreased picture quality.

Since the present invention is software based, it can dynamically vary the lookup table to accommodate varying paramaters, such as window size, scale, amount of memory available, etc.

Advantage is taken of the fact that the U and V planes are scaled down from the Y plane size in MPEG. In the YUV12 modes used in MPEG data, the U and V planes are scaled sown by two in each dimension. Thus when converting to an RGB image of the same dimensions, there will be two-by-two pixel squares which have the same U and V values, but potentially differing Y values. The table lookup method can be optimized knowing that only the Y parameter can change within a four pixel square.

Different tables can be used for converting the image to be displayed at native size, two times the native size, and at full screen.

Dithering can be incorporated into the table lookup scheme to eliminate banding of smooth color transitions which can occur in some display modes.

In accordance with an embodiment of the invention, a method of converting video data from a YUV format to an RGB format is comprised of (a) performing a matrix transformation of Y, U and V pixel data of a set of possible Y, U and V parameters into corresponding R, G and B parameters, (b) determining whether the set of R, G and B parameters forms a first lookup table whose size exceeds the size of a particular memory space, (c) in the event the lookup table is too large for the memory space, truncating least significant bits of at least the U and V parameters, (d) repeating steps (a), (b) and (c) until the first lookup table fits the memory space, and then storing the first lookup table in the memory space, and (e) using the first lookup table to provide RGB pixel data using the YUV data as addresses thereto.

BRIEF INTRODUCTION TO THE DRAWINGS

A better understanding of the invention will be obtained by considering the detailed description below, with reference to the following drawings, in which:

FIG. 1 illustrates image planes of YUV data and RGB data,

FIG. 2 illustrates a block diagram of part of a graphics processing portion of a desktop computer on which the present invention can be carried out, FIG. 3 is a flow chart of a preferred embodiment of the invention, FIG. 4 illustrates transformation of YUV data to a form for use as an index to a lookup table, FIG. 5 illustrates indexes for various sizes of pixel data bytes for a YUV signal, and FIG. 6 is a flow chart of another embodiment of the invention.

DETAILED DESCRIPTION OF PREFERRED EMBODIMENT

Figure 1:
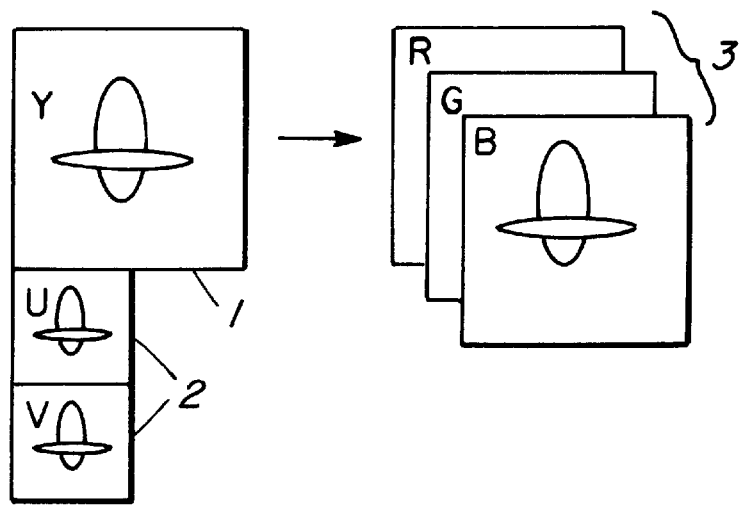
Figure 2:
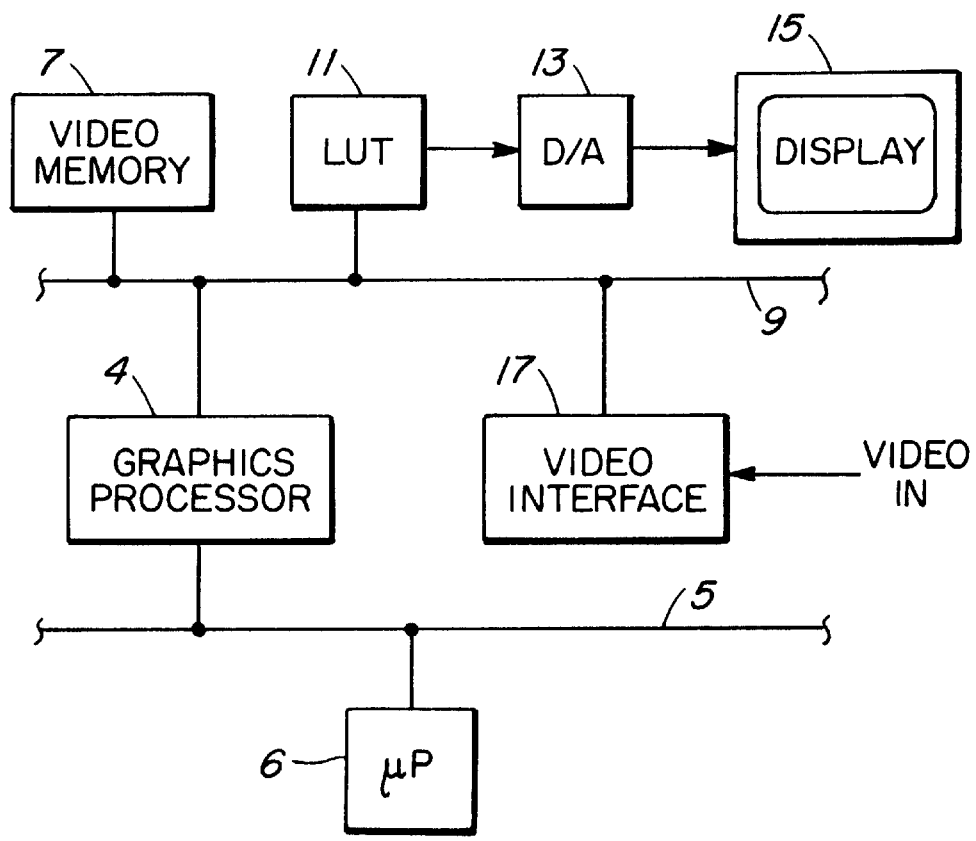

The invention may be implemented in a graphics subsystem of a desktop computer, the basic elements of which are shown in FIG. 2. A graphics processor 4 is connected to a main system expansion bus 5, to which the computer microprocessor 6 is conneced. Video memory 7 is connected to the graphics processor via a high speed bus 9. A lookup table 11 connects the high speed bus to a digital to analog converter 13, which has its output connected to an analog display 15 which displays an image corresponding to the pixel data presented to it in RGB format. A video interface 17 to which video input signals are applied is coupled to the graphics processor 4 via high speed bus 9.

The look-up table 11 can be and is typically combined with the video memory 7, but as the look-up table is important to the present invention, it has been shown and will be referred to separately. In addition the video memory will typically include a refresh register.

The basic system shown in FIG. 2 is described in the texts "Graphics Programming For The 8514/A" by Jake Richter et al, copyright 1990 by M & T Publishing Inc. of Redwood City Calif. and "Fundamentals Of Interactive Computer Graphics" by J. D. Foley et al, copyright 1982 by Addison-Wesley Publishing Company, Inc., and therefore a detailed description of operation of the hardware base on which the present invention can be operated is believed to be redundant.

However, it should be understood that the video data provided by the video interface 17 to the graphics processor 4 is in YUV format, and the data to be provided to the digital to analog converter 13 is in RGB format. In prior art systems the values of the Y, U and V parameters (referred to herein as Y, U and V parameters, or parms) are used as indexes to look-up table 11 where corresponding precalculated values of the RGB parameters or parms are read and provided to the D/A converter 13 for provision in analog form to display 15.

As noted in the Foley text (page 133 lines 6 and 7) the look-up table has as many entries as there are pixel values. As noted earlier, this can result in the requirement for an enormous memory space for best resolution and full video rate display, particularly for a large image.

Figure 3:
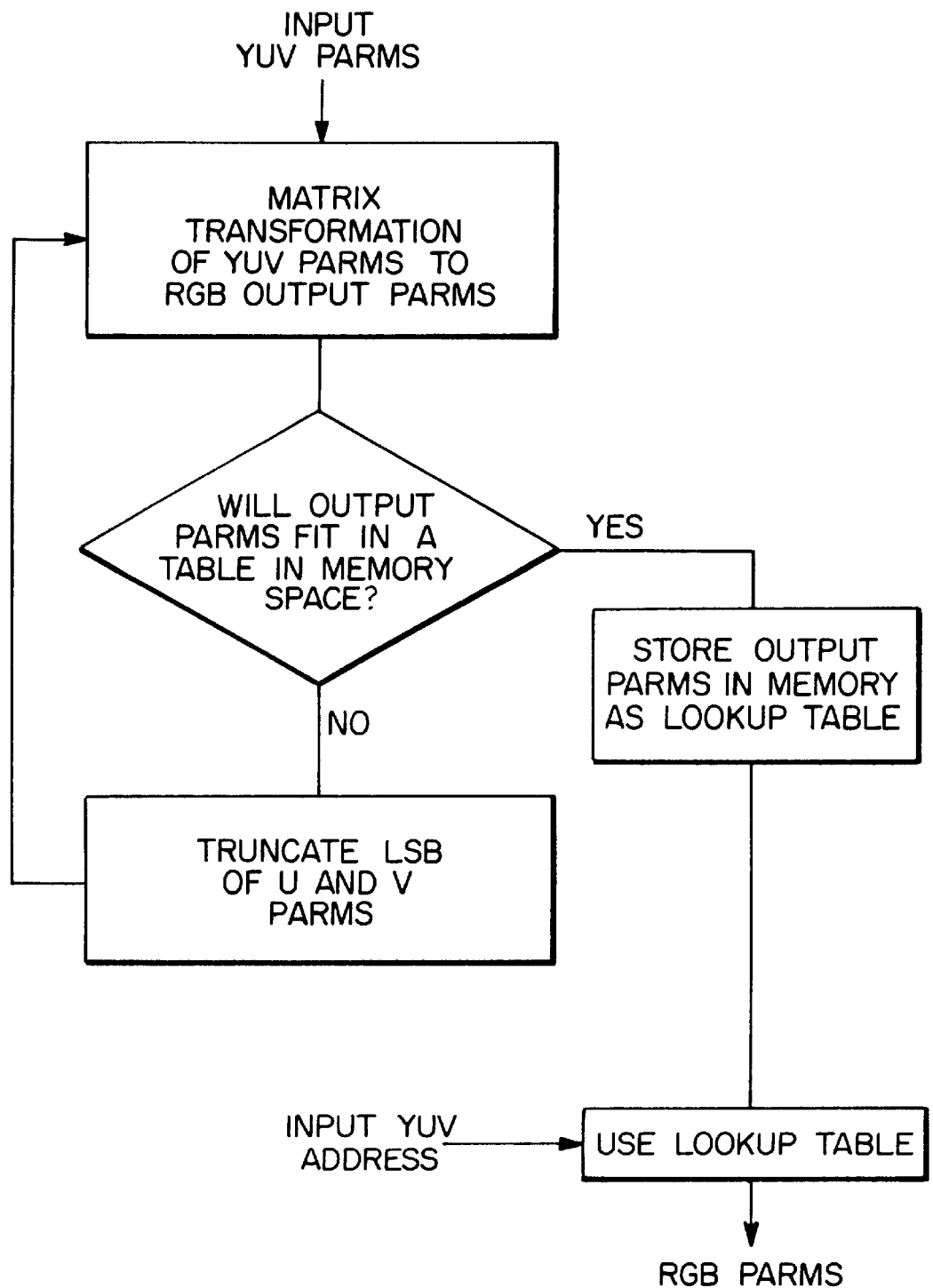

FIG. 3 illustrates a method by which the lookup table memory can be efficiently used, in accordance with an embodiment of the present invention, and involves the graphics processor to perform matrix transformation, and the look-up table 11.

The YUV parms are first matrix transformed to RGB output parms. This is preferably performed in a preliminary look-up table stored in video memory 7, in which the transformation parameters have been calculated by matrix multiplying in the the graphics processor the set of equations $R=1.164(Y-16)+1.596(V-16)$ $G=1.164(Y-16)-0.813(V-128)-0.39(U-128)$ $B=1.164(Y-16)+2.018(U-128)$ or a modification of the set of equations.

The YUV values used to perform the RGB values can initially be those that are provided by the input. The resulting RGB values, if stored in a look-up table, would take up a certain amount of memory space, which is typically limited due to other demands on the memory.

In accordance with the next step in the method, the size of the look-up table is compared against the amount of available memory space. If the memory space is sufficient, then the look-up table is stored in the memory. The look-up table is then used to process input video data with the YUV form of data as an address to the look-up table, to provide resulting RGB data, in a well known manner.

However if the memory space is not sufficient, the least significant bits of the U and V data is truncated, and the resulting combined U and V data with the Y data or the most significant bits of the Y data is matrix transformed as described above. The test described above as to whether there is sufficient memory space to hold the resulting look-up table is performed. If so, the data is stored as the look-up table, as described above. If there is insufficient memory space, the least significant bits of the already truncated U and V data is futher truncated. The method as describe is repeated until there is sufficient memory space for the look-up table and the look-up table has been successfully stored.

An advantage of the embodiment described above is that the color accuracy the resulting display will depend on the amount of memory available. Further, because the U, V and possibly the Y data has been truncated, the resolution of the data stored in the look-up table need not be as great as if every bit of the YUV input data words would be converted to a full scale RGB data word. Thus there can be a smaller look-up table required and the frame rate of the display can be very fast, i.e. at full speed playback of 30 frames per second. Indeed, laboratory tests have shown that a 352×240 pixel video image can be processed at about 80 frames per second on a computer that uses a 120 MHz Pentium processor.

Figure 4:
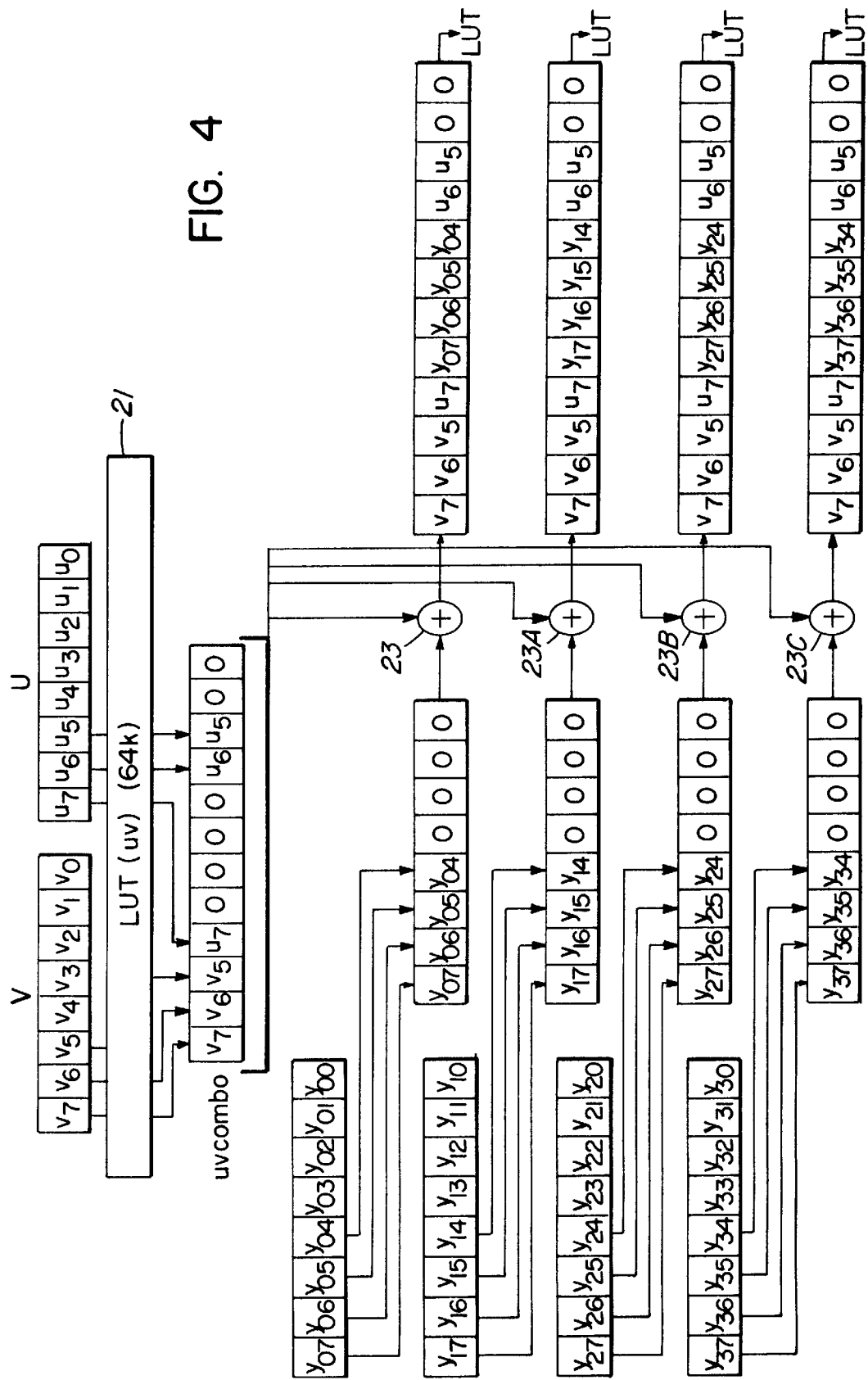

FIG. 4 illustrates an example of operation of the above described embodiment in more detail In this example, a pixel in YUV data form having 8 Y bits, 8 U bits and 8 V bits is truncated to a pixel in YUV data form having an accuracy of 4 Y bits, 3 U bits and 3 V bits. A look-up table 21 stored preferably in video memory 7 is addressed using an 8 bit U data word $u_0$–$u_7$ of a pixel, and using an 8 bit V data word $v_0$–$v_7$. The output of the look-up table is a 12 bit data word referred to herein as uvcombo in which the U data is truncated to bits $u_5$, $u_6$ and $u_7$, and in which the V data is truncated to bits $v_5$, $v_6$ and $v_7$, leaving four bit positions padded with 0's for the Y data and two additional bit positions padded with 0's.

The 8 bit Y data ($y_{00}$–$y_{07}$) has its four least significant bits masked, and the resulting word is added in an adder 23 with the uvcombo word, to result in a YUV combined word comprising two zero padded least significant bits, three U bits $u_5$–$u_7$, four Y bits $y_{04}$–$y_{07}$ and three V bits $v_5$–$v_7$.

This YUV combined word is used as an index into lookup table 11.

Other examples are shown of the derivation of other indexes into lookup table 11 using adjacent Y parameters of a four pixel block, with the same U and V parameters described above, e.g. y10–y17, y20–y27 and y30–y37. Each masked set of Y parameters is added to the above described uvcombo word, e.g. in respective adders 23A, 23B and 23C.

It has been determined that a lookup table 11 to accommodate a YUV word respectively 4,3,3 bits in size can be as small as 4 Kb. Lookup table 21 need only be 64 Kb in size. Thus the total lookup table memory requirement is 64 Kb+4 Kb, or 68 Kb. Such a small lookup table results in fast possible frame rates due to relatively small memory space to be read.

This can be compared with the lookup table requirement for the YUV(8,8,8) standard conversion to RGB which requires $2^{24}$ entries, each 3 bytes deep, resulting in the requirement for a 48 Mb lookup table. However current 32 bit computer architecture requires that data be 32 bit aligned, for optimal operation; the actual lookup table requirement is thus 64 Mb.

In contrast the present invention allow lookup tables of from (64 Kb+4 Kb) to 64 Mb to be used, depending on the amount of memory available, which can be determined on a dynamic basis considering the amount of memory available and the requirement for sharing with other programs, using the same method as described herein. Of course, the greater the amount of memory used in a lookup table, the more accurate will be the color, but the slower will be the possible frame rate depending on processor speed and byte size limitations.

The following table illustrates the lookup table size required, depending on the YUV significant bits used, increasing numbers of bits increasing the pixel RGB accuracy:

| YUV Significant bits | Lookup table sizes |
|---|---|
| (4,4,4) | 64 Kb + 16 Kb |
| (5,5,5) | 64 Kb + 128 Kb |
| (6,5,5) | 64 Kb + 256 Kb |
| (6,6,6) | 64 Kb + 1 Mb |
| (6,7,7) | 64 Kb + 4 Mb |
| (7,7,7) | 64 Kb + 8 Mb |
| (8,7,7) | 64 Kb + 16 Mb |

Figure 5:
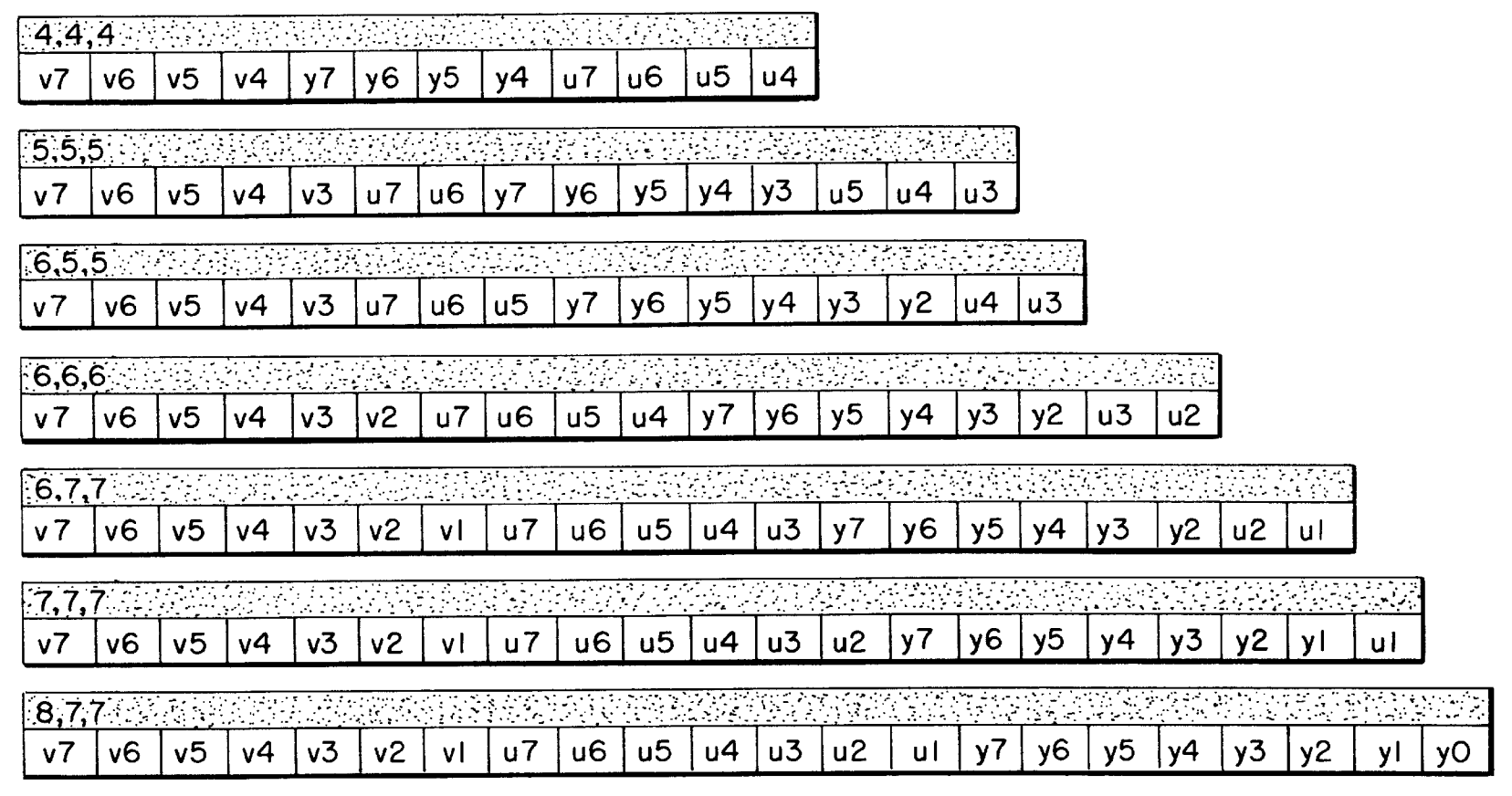

Preferred indexes for each of the cases shown in the table above are shown in FIG. 5.

Figure 6:
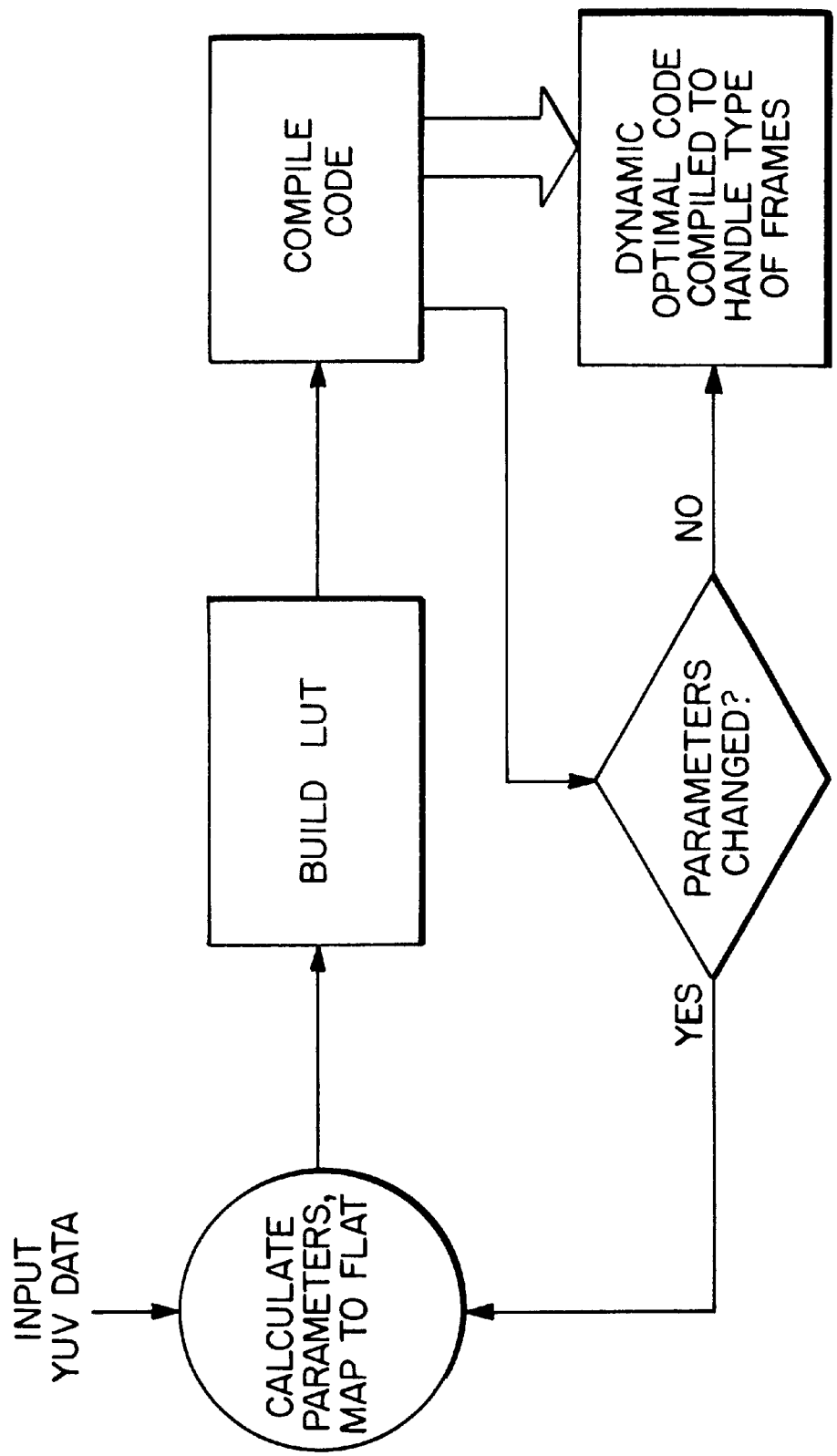

FIG. 6 illustrates a method for operation of a computer, which includes the method of FIG. 3. In the first step, from input YUV data the parms are calculated, and are mapped from 3 planes Y, U and V, to flat memory space. The lookup table 11 (LUT) is then built, using the method as already described. The data is then compiled, in preparation for storage.

The data is compared with parameters such as memory size change, display window size, etc. and if these parameters have not changed, the code is optimally compiled and stored. If the parameters have changed, the parms are recalculated and mapped to flat memory space. For example, if the window size has changed, the input pixels defined within a clipping rectangle may be changed, or a scaling factor may change, etc. In such cases the particular pixels processed in the methods described above would be changed, and a new lookup table would be calculated.

It should be noted that the lookup table can be optimized, once a scale factor has been established. For example, the YUV12 modes used in MPEG data have the U and V data planes scaled down by two in each dimension. Thus when converting to an RGB image of the same dimensions, there will be two-by-two pixel squares which have the same U and V values, but potentially differing Y values The table lookup scheme can be optimized knowing that only the Y parameter can change within a four pixel square.

Thus for this case, the lookup table can be addressed using the same U and V parameters twice in each orthogonal direction that distinguish a four pixel block, while using adjacent Y parameters of that four pixel block.

Indeed, the scaling factor need not be two, but can be any practical scaling factor, in which case instead of a two-by-two pixel square, any multiple of pixels Q to form a Q by Q pixel square, or differing horizontal Q and vertical R multiples can be used. In such cases the lookup table is accessed Q times, or Q times in the horizontal direction and R times in the vertical direction, using the same U and V values with the corresponding Y values for each pixel, using the truncated YUV pixel values as indexes to the lookup table as described above.

In some display modes, the number of bits per pixel alloted for color resolution is not sufficient to accurately reproduce the color of the video image. This results in banding of smooth color transitions, and false colors. To reduce these visual artifacts, dithering of the video images should be used. Dithering is meant in this context as stippling different colored pixels or pixel groups together to create a different perceived color. By incorporating dithering into the color conversion method a better looking image can be created with minimal increase in computational complexity.

It has been found that scaling by two provides 2×1 error diffusion dithering in RGB16, with no extra cost of conversion time. Dithering in the unscaled case can provide a virtual 2×2 dithering with one extra cycle every two pixels.

A program to implement the preferred embodiment of the invention is attached hereto as Appendix A, which is generated by the compiler for the case in which there is no clipping.

A person understanding this invention may now conceive of alternative structures and embodiments or variations of the above. All those which fall within the scope of the claims appended hereto are considered to be part of the present invention.

APPENDIX A

```
;    ESI always points to current source U
;    ESI+K_v always points to current source U
;    EDI always points to current Source Y
;    eax is used to store the uv combo used repeatedly for each 2x2 block of Y.
;    ebp is used as inner loop counter.
;    All the K_xyz are constants generated by the compiler and depends on the input
;       parameters.
;    K_MaskUV is Mask of UV (is 0F0F0h for 4,4,4 case)
;    K_MaskY is Mask of Y (is 0F0h for 4,4,4 case)
;    K_UVTAB is the linear (flat) address of UV lookup table.
;    K_YUVRGB is the linear address of the YUV to RGB lookup table
;    K_SrcPitch is the pitch of each source Y in bytes
;    K_SrcNewLineInc is the constant to adjust to move to next source line Y
;    K_NewLineVincr is the constant to adjust to move to next source line V
;    K_DsdtNewLineIncr is the constant to adjust to move to next dest line
;    K_PelsToDo is the number of blocks of 2x2 pixels in each iteration.
.repeat ; for each 2 lines
    .repeat ; for each 4 pixel block in 2 line
        mov   ah, [esi]              ; retrieve U
        mov   dl, [edi]              ; retrieve Y00
```

APPENDIX A-continued

```
        mov    al, [esi+K_v]                ; retrieve V
        mov    bl, [edi+1]                  ; retrieve Y01
        and    eax, K_MaskUV
        and    edx, K_MaskY
        mov    eax, [eax+K_UVTAB]
        and    ebx, K_MaskY
        or     edx, eax                     ; Got YUV(00) index
        or     ebx, eax                     ; Got YUV(01) index
        mov    edx, [4*edx+K_YUVRGB]
        mov    ebx, [4*ebx+K_YUVRGB+2]
        inc    esi
        or     edx, ebx
        mov    ds:[ecx], edx                ; Wrote D(0,0) D(0,1)
        mov    dl, [edi+K_SrcPitch]
        mov    bl, [edi+K_SrcPitch +1]
        add    edi, 2
        and    edx, K_MaskY
        and    ebx, K_MaskY
        or     edx, eax                     ; edx = YUV(1,0)
        or     ebx, eax                     ; ebx = YUV(1,1)
        mov    eax, [4*edx+ K_YUVRGB]
        mov    edx, [4*ebx+ K_YUVRGB +2]
        or     edx,eax
        dec    ebp
        mov    ds:[ecx+K_DstPitch],edx      ; D(1,0) D(1,1)
        lea    ecx,[ecx+4]                  ; advance to next destination pixel.
    .until (zero?)
    add edi,K_SrcNewLineInc
    add esi,K_NewLineVincr
    add ecx,K_DstNewLineIncr
    mov ebp,K_PelsToDo
.until (zero?)
```

We claim:

1. A method of converting video data from a YUV format to an RGB format comprising:

(a) performing a matrix transformation of Y, U and V pixel data of a set of possible Y, U and V parameters into corresponding R, G and B parameters, (b) determining whether the set of R, G and B parameters forms a first lookup table whose size exceeds the size of a particular memory space, (c) in the event the lookup table is too large for the memory space, truncating least significant bits of at least the U and V parameters, (d) repeating steps (a), (b) and (c) until the first lookup table fits the memory space, and then storing the first lookup table in the memory space, and (e) using the first lookup table to provide RGB pixel data using the YUV data as addresses thereto.

2. A method as defined in claim 1 in which step (e) is comprised of addressing the lookup table using the same U and V parameters of a four pixel block multiple times as well as adjacent Y parameters of the four pixel block, and retrieving data representing a four pixel block of R, G and B parameters.

3. A method as defined in claim 1 in which step (e) is comprised of addressing the lookup table using the same U and V parameters of a multiple pixel block multiple times as well as adjacent Y parameters of the multiple pixel block, and retrieving data representing a multiple pixel block of R, G and B parameters, wherein the multiple represents a scale factor between an input video image and an output video image.

4. A method as defined in claim 1 in which the truncating step is performed by addressing a preliminary lookup table using predetermined most significant bits of the U and V parameters and providing a resulting UV combination word, combining the UV combination word with most significant bits of a Y parameter, to form an address to said first lookup table.

5. A method as defined in claim 4 including masking least significant bits of a Y parameter and adding the UV combination word to the masked Y parameter to form an address to the first lookup table.

6. A method as defined in claim 5 in which step (e) is comprised of addressing the first lookup table using said address formed of the same U and V parameters for each of four pixels of a four pixel block and Y parameters for each of the pixels of the four pixel block.

7. A method as defined in claim 5 in which step (e) is comprised of addressing the first lookup table using said address, formed of the same U and V parameters for each of multiple pixels of a multiple pixel block and Y parameters for each of the pixels of the multiple pixel block, wherein the multiple represents a scale factor between an input video image and an output video image.

* * * * *